*(12)* United States Patent
Wolfe

*(10)* Patent No.: US 6,867,928 B2
*(45)* Date of Patent: Mar. 15, 2005

(54) METHOD AND APPARATUS FOR CORRECTING VISUAL ABERRATIONS IN IMAGE PROJECTION SYSTEMS

(75) Inventor: Charles Robert Wolfe, Palo Alto, CA (US)

(73) Assignee: Jenmar Visual Systems, Fremont, CA (US)

( * ) Notice: Subject to any disclaimer, the term of this patent is extended or adjusted under 35 U.S.C. 154(b) by 0 days.

(21) Appl. No.: 10/360,470

(22) Filed: Feb. 7, 2003

(65) Prior Publication Data

US 2004/0090684 A1 May 13, 2004

Related U.S. Application Data

(63) Continuation-in-part of application No. 10/291,079, filed on Nov. 8, 2002, now Pat. No. 6,807,020, which is a continuation-in-part of application No. 10/211,785, filed on Aug. 1, 2002, now Pat. No. 6,700,713.

(51) Int. Cl.[7] .......................... G02B 13/20; G03B 21/60
(52) U.S. Cl. .................. 359/707; 359/453; 359/452
(58) Field of Search .............................. 359/452, 453, 359/457, 626, 707

(56) References Cited

U.S. PATENT DOCUMENTS

| | | | |
|---|---|---|---|
| 4,502,755 A | 3/1985 | Mori et al. | |
| 4,725,134 A | 2/1988 | Ogino | |
| 4,824,227 A | 4/1989 | Goldenberg et al. | |
| 5,206,761 A | 4/1993 | Ogino | |
| 5,289,311 A | 2/1994 | McClelland et al. | |
| 5,485,308 A | 1/1996 | Hirata et al. | |
| 5,513,037 A | 4/1996 | Yoshida et al. | |
| 5,563,738 A | 10/1996 | Vance | |
| 5,751,478 A | 5/1998 | Yoshimura et al. | |
| 5,781,344 A | 7/1998 | Vance | |
| 6,046,847 A | 4/2000 | Takahashi | |
| 6,076,933 A | 6/2000 | DiLoreto et al. | |
| 6,185,038 B1 | 2/2001 | Yamaguchi et al. | |
| 6,292,294 B1 | 9/2001 | Takahashi et al. | |
| 6,519,087 B2 * | 2/2003 | Moshrefzadeh | 359/453 |

OTHER PUBLICATIONS

International Search Report dated Nov. 3, 2003, for International Application No. PCT/US03/19611, filed on Jun. 20, 2003.

* cited by examiner

*Primary Examiner*—David N. Spector
(74) *Attorney, Agent, or Firm*—Fenwick & West LLP

(57) ABSTRACT

High spatial frequency optical noise in the form of intensity contrasting picture elements in the display of a projected light image on a bead-oriented image-enhancing filter is significantly reduced by interposing light-scattering material in the optical path between a source of the projected light image and the display in order to inhibit formation and interference of coherent light waves, and to mask the appearance of separate or discrete beaded apertures.

19 Claims, 10 Drawing Sheets

| Sample (Screen Substrate/Film on Fresnel) | Average | stdev | Speckle & Grain Contrast |
|---|---|---|---|
| AR Glass/Bare Fresnel | 99.39 | 24.17 | 0.2432 |
| AR Glass/Fresnel With AG92 | 101.24 | 24.78 | 0.2448 |
| AR Glass/Fresnel With AG40 | 109.76 | 18.51 | 0.1686 |
| AR Glass/Fresnel With AG 10 | 109.6 | 18.73 | 0.1709 |
|  |  |  |  |
| AG-10 Plastic/Bare Fresnel | 110.8 | 10.04 | 0.0906 |
| AG-10 Plastic/Fresnel With AG92 | 111.64 | 9.76 | 0.0874 |
| AG-10 Plastic/Fresnel With AG40 | 112.13 | 8.17 | 0.0729 |
| AG-10 Plastic/Fresnel With AG10 | 111.27 | 8.46 | 0.0760 |
|  |  |  |  |
| NG-30/ Bare Fresnel | 115.78 | 22.69 | 0.1960 |
| NG-30/ AG-92 on Fresnel | 118.42 | 20.73 | 0.1751 |
| NG-30/ AG-40 on Fresnel | 118.97 | 17.14 | 0.1441 |
| NG-30/ AG-10 on Fresnel | 117.98 | 18.19 | 0.1542 |
|  |  |  |  |
| NG-5/ Bare Fresnel | 111.26 | 8.19 | 0.0736 |
| NG-5/ Fresnel With AG92 | 111.02 | 7.09 | 0.0639 |
| NG-5/ Fresnel With AG40 | 112.33 | 5.94 | 0.0529 |
| NG-5/ Fresnel With AG10 | 112.43 | 6.65 | 0.0591 |

FIG. 5

| Sample (Screen Substrate/Diffuser) | Average | stdev | Speckle Contrast |
|---|---|---|---|
| AR/Bare | 109.33 | 18.91 | 0.173 |
| AR/AG-92 | 107.98 | 20.01 | 0.185 |
| AR/AG-40 | 114.06 | 14.77 | 0.129 |
| AR/AG-10 | 108.57 | 13.12 | 0.121 |
| | | | |
| AG-10/Bare | 110.88 | 7.46 | 0.067 |
| AG-10/AG-92 | 111.05 | 8.25 | 0.074 |
| AG-10/AG-40 | 123.39 | 4.93 | 0.040 |
| AG-10/AG-10 | 112.25 | 6.58 | 0.059 |
| | | | |
| NG-5/Bare | 111.22 | 6.79 | 0.061 |
| NG-5/AG-92 | 111.27 | 6.82 | 0.061 |
| NG-5/AG-40 | 126.94 | 5.27 | 0.042 |
| NG-5/AG-10 | 112.47 | 5.71 | 0.051 |
| | | | |
| NG-30/Bare | 108.6 | 18.61 | 0.171 |
| NG-30/AG-92 | 109.6 | 18.4 | 0.169 |
| NG-30/AG-40 | 120.49 | 11.69 | 0.097 |
| NG-30/AG-10 | 109.72 | 15.04 | 0.137 |

FIG. 7

| Identification Number | Properties | Gain |
|---|---|---|
| 798-48-2 | 2.2 RI, 4.5% Black | 0.61 |
| 798-49-1 | 2.2 RI, 3.0% Black | 0.67 |
| 798-49-2 | 2.2 RI, 1.5% Black | 0.80 |

| Sample (image #) | Average | stdev | Speckle Contrast | Image Size (millions of pixels) |
|---|---|---|---|---|
| 798-48-2 (1) | 131.12 | 16.52 | 0.126 | 1.7 |
| 798-48-2 (2) | 131.73 | 13.42 | 0.102 | 1.6 |
| 798-48-1 (3) | 133 | 12.46 | 0.094 | 1.8 |
| 798-48-1 (4) | 133.72 | 14.63 | 0.109 | 1.6 |
| 798-48-2 (5) | 135.39 | 10.98 | 0.081 | 1.8 |
| 798-48-2 (6) | 135.09 | 15.39 | 0.114 | 1.6 |
| 100S (7) | 112.43 | 14.73 | 0.131 | 1.7 |
| 100S (8) | 111.72 | 14.68 | 0.131 | 1.8 |
| 170S (9) | 108.14 | 21.21 | 0.196 | 1.7 |
| 170S (10) | 108.65 | 21.79 | 0.201 | 1.5 |

METHOD AND APPARATUS FOR CORRECTING VISUAL ABERRATIONS IN IMAGE PROJECTION SYSTEMS

RELATED CASES

This application is a continuation-in-part of U.S. patent application Ser. No. 10/291,079, entitled "Lens Optimization and Color Correction for Image Projection Systems", filed on Nov. 8, 2002 by C. R. Wolfe now U.S. Pat. No. 6,807,020, which application is a continuation-in-part of U.S. patent application Ser. No. 10/211,785, entitled "Lens Optimizing for Image Projection Systems", filed on Aug. 1, 2002 by C. R. Wolfe, now issue as U.S. Pat. No. 6,700,713, which subject matter is incorporated herein in the entirety by this reference to form a part hereof.

FIELD OF THE INVENTION

This invention relates image projection systems commonly used in projection television receivers, and more particularly to method and apparatus for correcting image intensity aberrations in the projected images on the viewing screens of such systems.

BACKGROUND OF THE INVENTION

Modern high definition (high resolution) television projectors, video wall projection engines, and rear-projection engines in general commonly employ a single lens for projecting the three primary colors of an image toward a viewing screen. Projection optics focus the images in three primary colors upon a viewing screen that typically includes a single layer of transparent microspheres contiguously oriented on a side of the viewing screen opposite the side facing a viewer.

In such image projection systems there commonly appear on the viewing screen tiny regions of visually distinctive image intensity well above or well below the average intensities of the projected image (referred to herein as 'speckles'). Such speckles of high and low image intensity are substantially high spatial frequency optical noise believed to be caused by interference of partially coherent projected light rays or waves. These speckles appear to flicker or move with changes in viewing angle and are objectionable characteristics that are to be minimized and eliminated.

There is an additional component of this high frequency noise that appears static, and does not appear to shimmer or flicker with changes in viewing angle. These tiny regions of high and low intensity light can be clearly distinguishable from speckle. These tiny static regions of high and low light intensity are termed "screen grain or graininess," and are believed to be caused by uneven penetration through the thin black layer by the optical beads that comprise the beaded screen. The uneven penetration of beads causes smaller or larger apertures for image light to pass to the viewing screen. These regions are also objectionable to viewers and are to be minimized or eliminated.

SUMMARY OF THE INVENTION

In accordance with one embodiment of the present invention, speckles of distinctive image intensity on the viewing screen of an image projection system are significantly reduced with the aid of optical-scattering coatings or layers or materials disposed at one or other locations within the projection system to disperse coherent light sufficiently to inhibit formation of spatial interference within the projected image. The resulting scattered and non-coherent image light significantly inhibits interference and substantially reduces speckles over the image-viewing area.

In accordance with another embodiment of the present invention, both speckle and graininess on the viewing screen of an image projection system are significantly reduced with the aid of optical scattering coatings or layers disposed within the substrate or on the front of the viewing screen, or generally between the bead apertures and the viewer.

BRIEF DESCRIPTION OF THE DRAWINGS

FIG. 5 is a table of test data showing the effectiveness of various light-scattering schemes;

FIG. 7 is a table of test data on other embodiments of the present invention;

DETAILED DESCRIPTION OF THE INVENTION

Figure 1A:
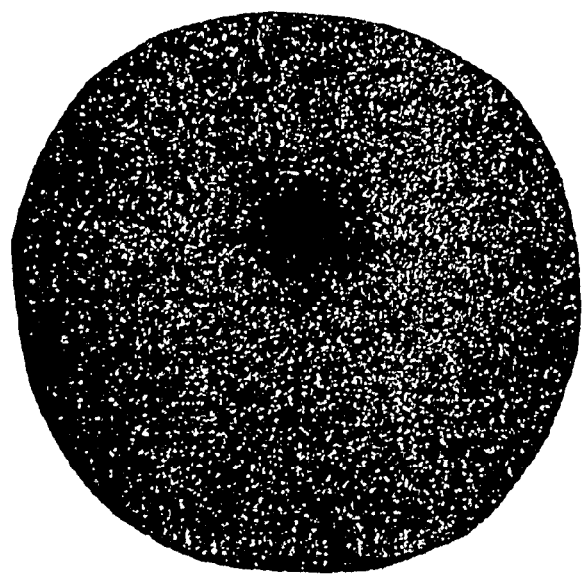
FIGS. 1a and 1b are pictorial illustrations of, respectively, speckle and grain aberrations and no speckles or grain in a projected image viewing area.
Figure 1B:
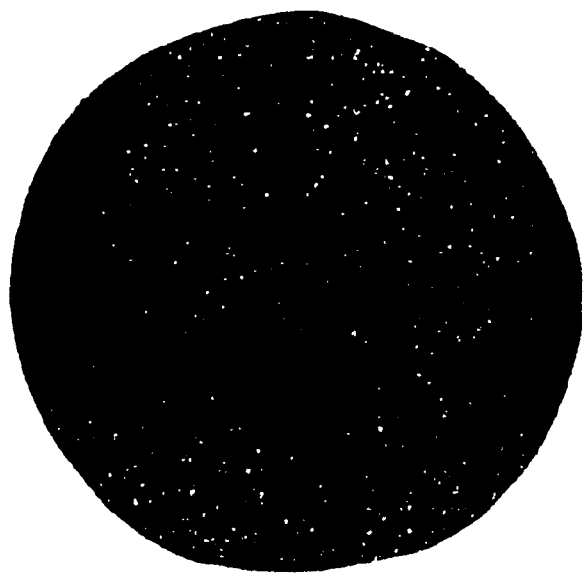

Referring now to FIG. 1a, there is shown a viewing area of a projected light image in which minute areas of high and low light intensity (called speckle and grain herein) are distributed over the image viewing area. These aberrations are believed to be caused by interference of partially coherent light waves in the image projection system, or by smaller or larger apertures created by uneven bead penetration. These artifacts represent high spatial frequency optical noise and may be controlled in accordance with the present invention by reducing the coherence of projected light waves using light-scattering material interposed in the image projection system between the image projector and the image viewing screen and by using scattering media interposed between the bead apertures and the viewer. As shown in FIG. 1b, such speckles are substantially eliminated in one or other embodiments of the present invention, as later described in detail herein.

Figure 2A:
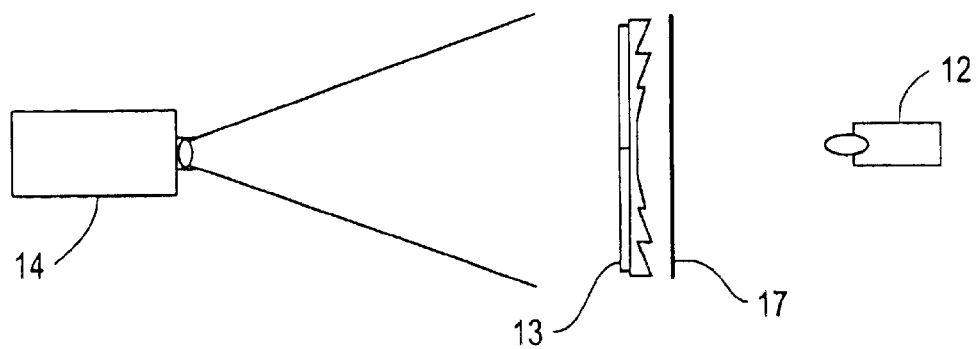
FIGS. 2a and 2b are pictorial illustrations of test setups for analyzing speckle and grain attenuation.

Referring now to FIG. 2a, there is shown a top pictorial view of a test setup for quantifying the speckle characteristics of an image projection system with and without speckle and grain correction aspects of the present invention. Specifically, a bead-oriented, image-enhancing filter element 17 is spaced from a Fresnel lens 13 that receives incident light from an image source 14 (or test projector) that is spaced away from the lens 13 by its focal length. A digital camera 12 is focused on the viewing surface or display screen of the filter element 17 to digitally record an image of the display attributable to projected light (e.g., a uniform blue field) transmitted through the assembled projection system to the display screen. The digital image of the display screen is then analyzed using commercially-available computer program (i.e., Adobe Photoshop™, Matrox Inspector™) to determine the average illumination of the display screen (e.g., a gray scale level among the picture elements), and the standard deviation of illumination over an image size of display screen that includes about 3.1 million picture elements, or pixels. A histogram analysis of the digital image of the display screen established an average pixel illumination (or gray scale) and the standard deviation of pixel illuminations in each embodiment of the assembled projection system including light-scattering elements according to the present invention, as later described herein.

Figure 2B:
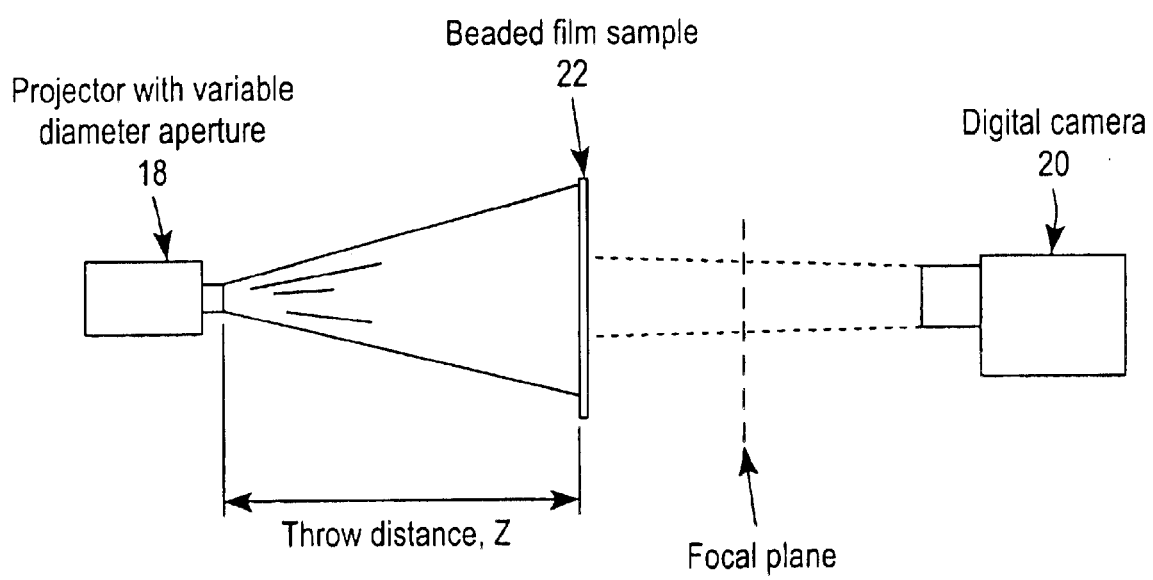

Another test apparatus can be used to help distinguish between speckle and grain, as illustrated in FIG. 2b. This apparatus includes a light source 18 and a digital camera 20 that is focused about 100 mm in front of the image-enhancing screen 22 under test, instead of being focused on the screen as in FIG. 2a. This causes the camera 20 to see the fully developed interference pattern that causes speckle. Since the focus is well away from the viewing surface of screen 22, this apparatus does not detect grain very well. The aperture of the light source and the throw or projection distance to the screen can be varied to control the amount of spatial coherence in the light beam passing through the screen.

Figure 2C:
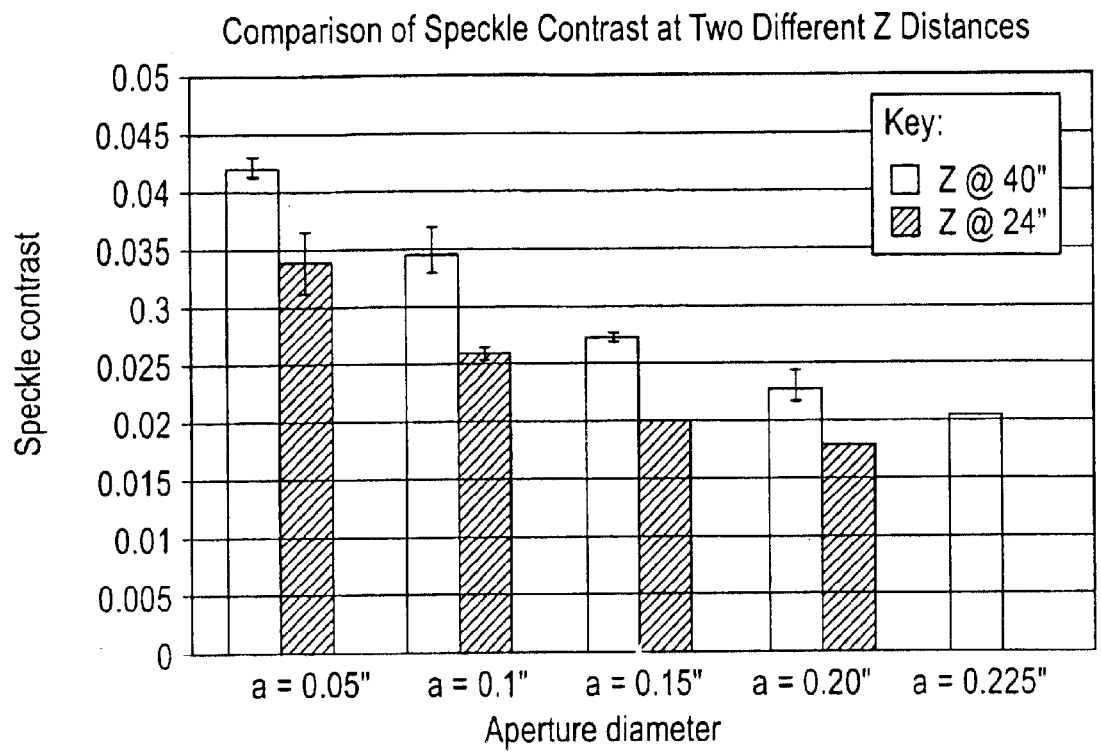
FIG. 2c is a graph showing speckle contrast as a function of aperture diameter for various projection distance.

Digital photographs made using this apparatus can be analyzed in the same manner as described above. When this is done, the speckle contrast is found to be dependent on the amount of spatial coherence, as shown by the graph of FIG. 2c.

Figure 3:
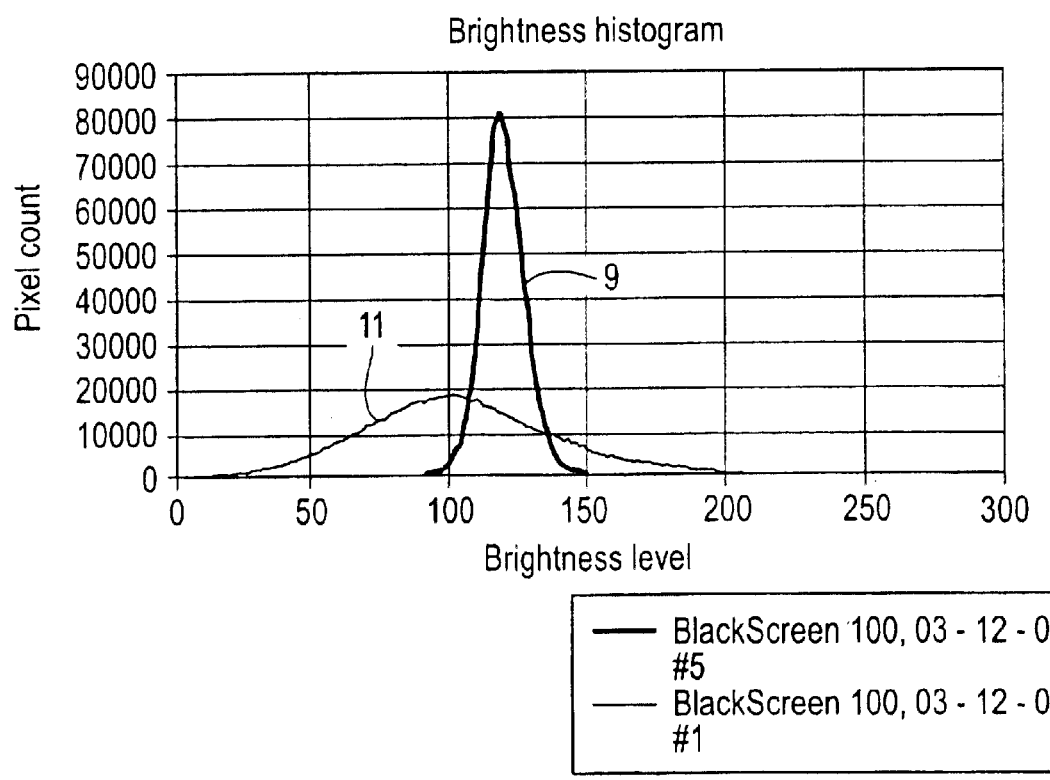
FIG. 3 is a graph showing distributions of picture element (pixel) intensity levels on the display screen of an image projection system.

Referring now to the graph of FIG. 3, there is shown a graph of pixel brightness measured over the area of an image-viewing screen. The viewing area is analyzed over multiple thousands of picture elements (i.e. the 'pixels' herein). Many of such pixels appear in scattered array over the entire viewing area with distinctively contrasting light intensities, as illustrated in FIG. 1a, in the absence of correction according to the present invention. Specifically, the trace 9 in the graph of FIG. 3 illustrates that a substantial number of the pixels exhibit fairly uniform luminous intensity in the relative brightness range between about 100 and 130, and this condition in an image projection system is manifested as a viewing screen of substantially uniform luminous intensity over the entire viewing area, as illustrated in FIG. 1b.

In contrast, the trace 11 in the graph of FIG. 3 illustrates that significant numbers of pixels of luminous intensities in the relative brightness range as low as about 30 and as high as about 170 are distributed over the entire viewing area, and such visually-contrasting pixels appear as intensity anomalies, or speckles of high spatial frequency optical noise over the viewing area, as illustrated in FIG. 1a.

Figure 4:
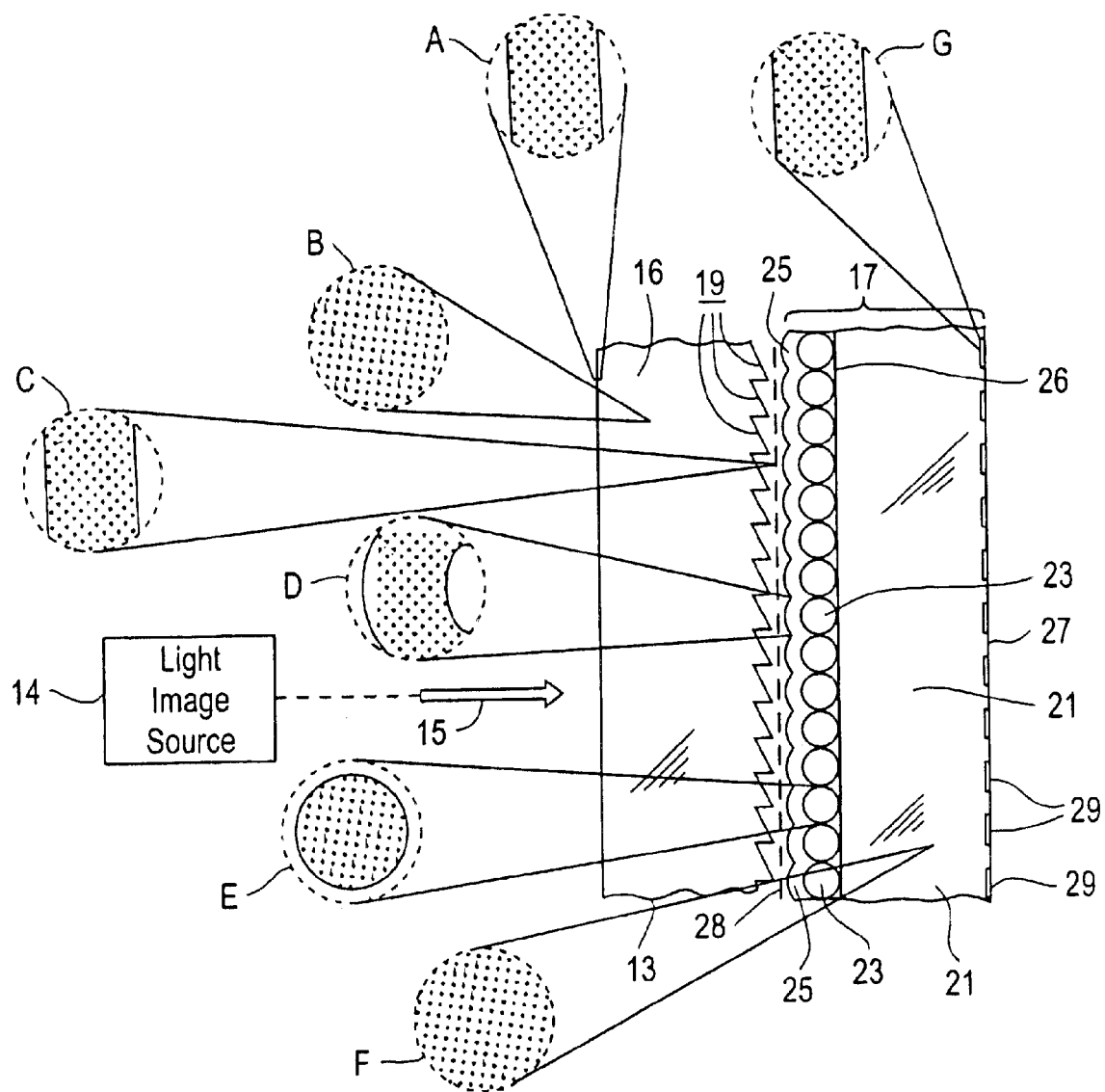
FIG. 4 is a partial pictorial top view of an embodiment of the present invention illustrating locations at which light scattering materials maybe disposed within the light image projection system.

Referring now to the partial sectional top view of FIG. 4, there is shown the composite structure of an image projection system in accordance with the present invention. A Fresnel lens 13 is positioned along an image projection path 15 from light image source 14 forward of, and spaced from, a beaded filter element 17. Filter elements of this type for use in image projection systems are described in the literature (see, for example, U.S. Pat. Nos. 5,563,738; 5,781,344; 6,076,933). The Fresnel lens 13 is formed in known manner on a substrate 16 of optically-transmissive material with substantially circular (or spiraled) pitched surfaces 19 that approximate contiguous segments of a spherically-curved lens, commonly in a sheet of thermosetting plastic material such as acrylic or methyl methacrylate, or the like.

The filter element 17 includes a substrate 21 of the optically transmissive material and a single layer of minute optically-transmissive spheres 23 disposed on the light-incident surface of the substrate 21. The intersticial volume 26 between beads and surface of the substrate is substantially filled to a depth of about the radius of the beads with light-opaque material such as epoxy filled with carbon particles. This leaves apertures at and about the contact points of the beads 23 with the surface of the substrate 21 for the transmission therethrough of transmitted light incident upon the layer of beads 23. A substantially conformal layer 25 of optically transmissive material, for example of the types previously described herein, overlays each of the beads 23 in the layer previously described herein, and this composite structure of filter element 17 is spaced in air away from the pitched surface 19 of the Fresnel lens 13. The front or viewing surface 27 of the filter element 17 may include one or more optical components such as an anti-glare coating or anti-glare surface, or anti-reflective coating, or anti-scratch coating, or the like.

In accordance with the present invention, a light-dispersive, or light-scattering optical component may be interposed in the light path 15 of the projected image between the projected image source 14 and the viewing surface 27 in one or more of the locations designated "A through G" in FIG. 4, depicted as a greatly magnified section shown at each location. For example, optically scattering elements in the substrates 16, 21(B,F) or in the beads 23(E) or in the conformal layer 25(D) adequately randomly disperse the projected light image sufficiently to inhibit formation of even partially-coherent light wave and formation of resultant interference patterns that can form speckles of contrasting luminous intensity on the viewing screen 27. Alternatively, light-scattering etched or roughened surfaces of surface coatings 29 on the incident or pitched surfaces of the Fresnel lens 13, or on the conformal layer 25 or viewing surface 27 (G) also adequately randomly disperse the projected light image to inhibit formation of even partially-coherent light waves, and formation of interference patterns that can form speckles of contrasting luminous intensity on the viewing screen 27.

In another embodiment of the present invention, a layer 28 of light-diffusing material (C) may be interposed in the air space between the Fresnel lens 13 and the filter element 17, or may be positioned in the projected light image path 15 between the light image source 14 and the incident surface of the Fresnel lens 13.

In each of several embodiments of the invention, a sheet of commercially-available glass or acrylic material having various light-diffusing surface properties is disposed adjacent a component (e.g. the light-incident surface of the Fresnel lens 13) to test the results on speckle attenuation of such light-diffusing components functioning alone or in combinations of diffusive substrates and diffusive surface treatments. Specifically commercially-designated grades of non-glare etched glass, NG-5 (gloss level 5) and NG-30 (gloss level 30), and anti-reflective glass (AR) and anti-glare acrylic AG-10 (gloss level 10) were tested alone and additionally with commercially-available anti-glare films such as AG-92 and AG-40 and AG-10 (gloss levels of, respectively, 92, 40 and 10) applied to the smooth side of the Fresnel lens 13. With the projector as a light image source 14 supplying a uniform field of illumination (e.g., blue light) along the projection path 15, the digital camera 12, arranged as illustrated in FIG. 2a, captured the image of the display screen for analysis using a commercial computer program as previously referenced herein to determine average illumination (i.e., gray scale) and the standard deviation of illumination in each assembled projection system. The table of FIG. 5 shows the test results for the average illumination of each pixel, the standard deviation from this average, and the speckle and grain contrast calculate according to the equation:

$$\text{Speckle and Grain Contrast} = \frac{\text{Standard Deviation}}{\text{Average Gray Scale}}.$$

Figure 6:
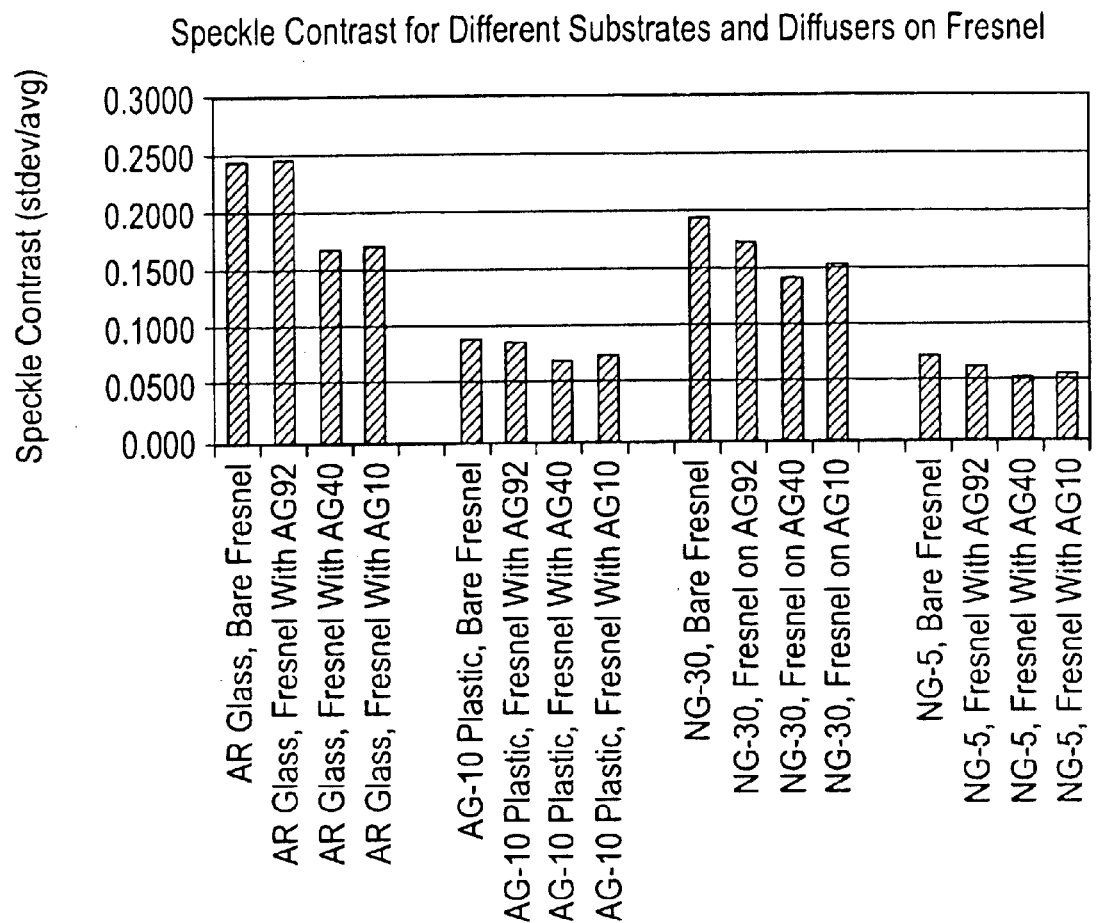
FIG. 6 is a chart illustrating the test results compiled in FIG. 5.

FIG. 6 illustrates the histogram of these test results.

Figures 8, 9:
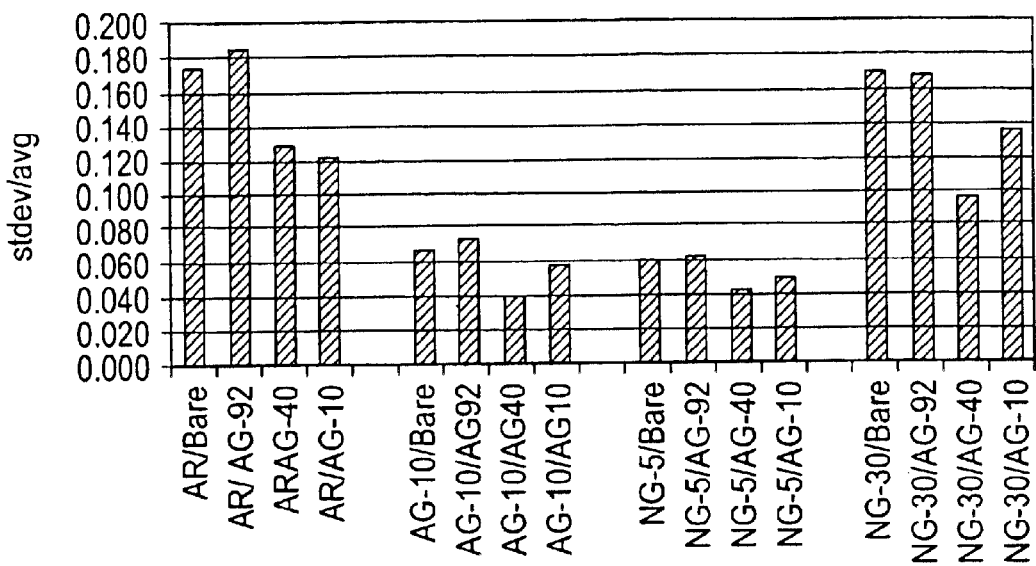
FIG. 8 is a chart illustrating the test results compiled in FIG. 7.
FIG. 9 is a table of test data on embodiments of the present invention including light-diffusing beads.

In other embodiments of the present invention, a sheet or layer of such glass or acrylic material, with or without anti-glare surface films, was disposed between the Fresnel lens 13 and filter element 17 and was similarly tested for speckle and grain attenuation. FIG. 7 shows the results of the same test parameters, and FIG. 8 illustrates the histogram of these test results.

Figures 10, 11:
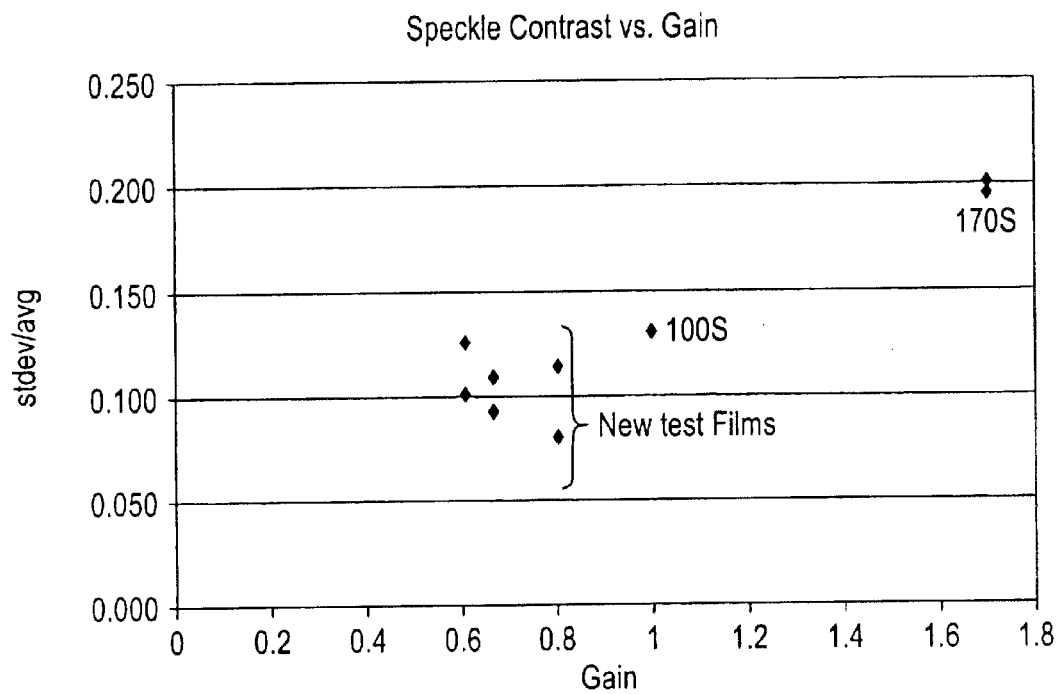
FIG. 10 is a chart showing test results of another embodiment of the present invention.
FIG. 11 is a chart showing plots of speckle contrast vs. gain.

In still other embodiments of the present invention, the filter element 17 was formed with micospheres or beads 23 of glass including diffusive or light-scattering elements in the beads that are disposed on the light-incident surface of the substrate 21. The bead diameter is about 70 $\mu$m, and the material may include micron-size particles of quartz or silicon dioxide, or the like, as light-scattering elements. Tests were conducted in the manner as previously described for the effects on speckle attenuation and also for such effects relative to adjustments in the optical gain of the filter element 17. This latter parameter is affected by the refractive index (RI) of the glass that forms the beads 23, and by the size of the aperture at and around each point of contact of a bead 23 with the surface of the substrate 21. Although the glass forming the beads 23, and hence the RI, is 'fixed' for an assembled image filter 17, the aperture around the described point of contact can be modified by altering the degree of transmissivity of the filler layer 26 in the interstices between beads 23 and substrate 21. The transmissivity of this filler layer 26 may be modified by altering the amount of carbon particles included in the filler material 26. FIG. 9 shows the test results on the gain of the filter element 17 as a function of the amount of carbon particles (black) included in the filler material 26 (and, hence, on size of aperture). These image filters 17, and standard image filters (e.g., Black Screen™ 100S and 170S, commercially available from Jenmar Visual Systems of Fremont, Calif.) were each tested twice at different segments of the display and with different total numbers of pixels analyzed, with speckle attenuation and test results as set out in FIG. 10. These test results may be skewed by bright displayed spots that are attributable to fabrication anomalies and non-uniformities. However, it is noted that the image filters (including light-diffusing beads) have lower gain than the standard image filters (100S and 170S), so the relationship between speckle attenuation and gain of the image filter was examined, as illustrated in the chart of FIG. 11. From the plotted data, there appears to be no significant correlation between speckle attenuation (i.e., stdev/avg) and the gains of the image filters 17 with light-diffusive beads 23.

In still other embodiments of the present invention, the materials used in substrates or in surface coatings or in a layer interposed within the path of the projected light image, random light dispersion or scattering may be accomplished using abraded or etched surfaces, or light-scattering elements such as microscopic particles of, for example, quartz or air bubbles distributed throughout the optical material or coating or layer thus disposed in the path of the projected light image. Particles or other scattering elements in a range of less than about 10 $\mu$m have been determined to provide sufficient random dispersion of the projected light image to inhibit formation of even partially-coherent light waves and resultant speckles on the viewing surface 27. Such light-diffusing particles or scattering elements may be suspended in curable adhesive material such as epoxy for application to one or more of the incident and pitched surfaces of the Fresnel lens 13, or to the conformal coating 25 or viewing surface 27 of the filter element 17.

Figure 12A:
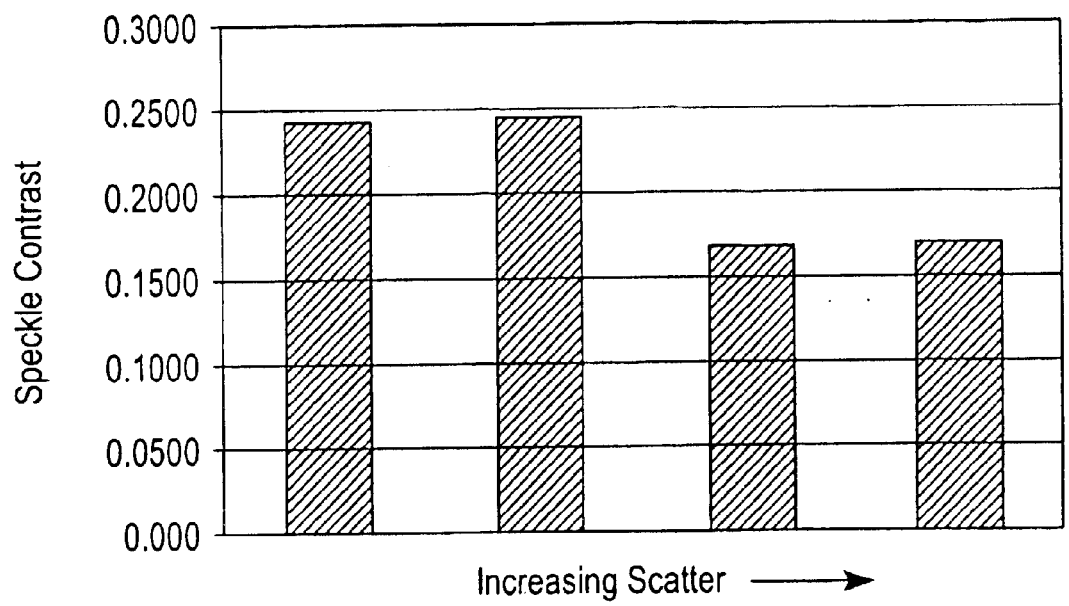
FIG. 12a is a chart illustrating speckle and grain contrast vs. scattering produced on the Fresnel lens.

Referring now to FIG. 12a, there is shown a bar chart indicating speckle and grain contrast as a function of increased light scattering promoted by coating the light-incident surface of the Fresnel lens 13 of FIG. 4.

Figure 12B:
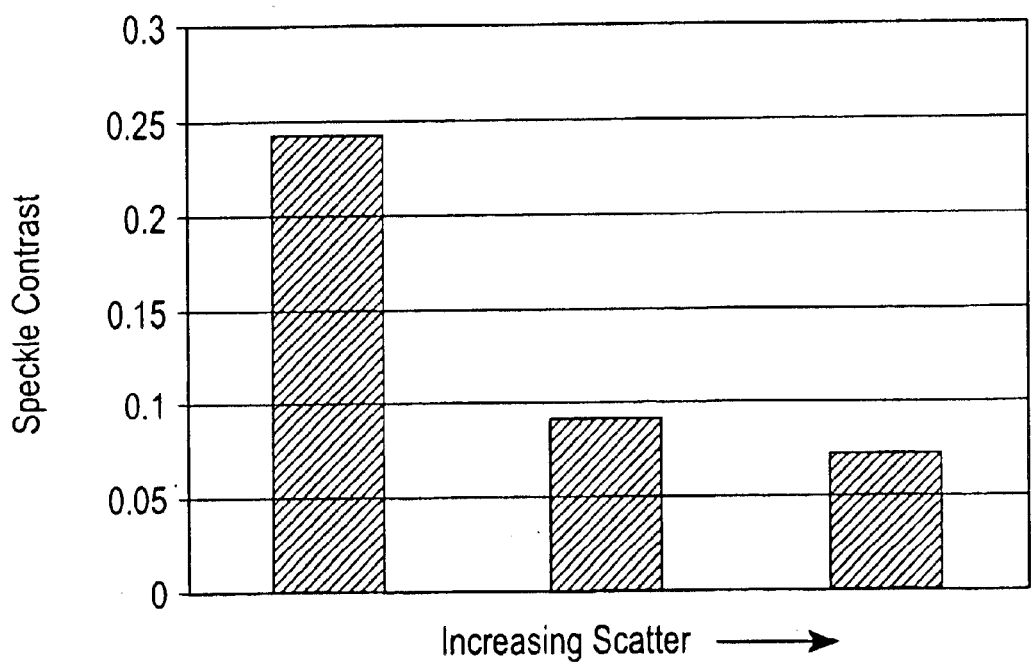
FIG. 12b is a chart illustrating speckle and grain contrast vs. scattering produced on the front surface of the display screen.

Referring now to FIG. 12b, there is shown a bar chart indicating speckle and grain contrasts as a function of light scattering promoted by coating the viewing surface 27 of the filter element 17 of FIG. 4. In this embodiment of the present invention, speckle and grain are reduced to a very low magnitude of less than about 0.1. A value of zero would indicate an absolutely uniform image screen. This embodiment reduces speckle and grain significantly because the scattering is introduced at the viewing surface of the screen. Scattering at this point in the optical path smears the anomalies of pixel intensities but reduces the resolution of the screen. Thus, an optimized balance may be established in actual embodiments of viewing screens, by testing with specific projectors and output digitizers on various alternative light-scattering schemes according to the present invention in order to provide optimal speckle and grain attenuation.

Therefore, high spatial frequency optical noise, manifested as intensity-contrasting 'speckles' and grain distributed over the area of the viewing surface, is significantly reduced in a light image projection system. The speckles and grain are believed to be attributable to interference of partially-coherent light waves and bead apertures of the screen. These artifacts are attenuated by positioning light-diffusive material in the projection path between the light image source and the viewing screen to inhibit formation of even partially-coherent light waves and resultant speckles and grains. Several optional orientations of light-diffusive materials disposed within the path of the projected light image thus prevent formation of intensity-contrasting speckles and grain on the viewing screen.

What is claimed is:

1. A light image projection apparatus comprising:
a source of light image for projection to a viewing surface;
a lens interposed between the source and viewing surface for substantially collimating a projected light image from the source;
an image filter interposed between the lens and the view surface for receiving the substantially collimated light image projected from the source; and
wherein the lens and the image filter each include a substrate of light-transmissive material, including in at least one of the substrates inhomogeneous light-scattering elements distributed therein to scatter a light image transmitted therethrough.

2. The light image projection system according to claim 1 in which the inhomogeneous light scattering elements include bubbles distributed within the material having a dimensional range of less than about 10 µm.

3. The light image projection system according to claim 1 in which the inhomogeneous light scattering elements include particles distributed within the material having a dimensional range of less than about 10 µm.

4. The light image projection system according to claim 1 in which the inhomogeneous light-scattering elements are disposed within the materials of each of the substrates.

5. The light image projection apparatus according to claim 1 in which the image filter includes a substrate of light-transmissive material, and includes a single layer of spherical beads disposed in contiguous array on a surface of the substrate, and the material of the beads includes light-scattering elements therein to scatter light transmitted therethrough.

6. The light image projection apparatus according to claim 5 in which the light-scattering elements in the beads includes bubbles distributed therein having dimensions in the range of less than about 10 µm.

7. The light image projection apparatus according to claim 5 in which the light-scattering elements in the beads includes particles distributed therein having dimensions in the range of less than about 10 µm.

8. The light image projection apparatus according to claim 1 in which the image filter includes a single layer of spherical beads disposed in contiguous array on a surface of a substrate for transmitting light through the beads and substrate, and including:

a substantially conformal layer over the layer of beads of a light-transmissive material having light scattering elements distributed therein for scattering light transmitted therethrough.

9. The light image projection apparatus according to claim 8 in which the material of the conformal layer includes bubbles distributed therein having dimensions in the range of less than about 10 µm.

10. The light image projection apparatus according to claim 8 in which the material of the conformal layer includes particles distributed therein having dimensions in the range of less than about 10 µm.

11. The light image projection apparatus according to claim 1 including a layer of light-scattering material interposed between the lens and the image filter.

12. The light image projection apparatus according to claim 11 in which the material of the layer includes bubbles distributed therein having dimensions in the range of less than about 10 µm.

13. The light image projection according to claim 11 in which the material of the layer includes particles distributed therein having dimensions in the range of less than about 10 µm.

14. The light image projection apparatus according to claim 1 in which the inhomogeneous light-scattering elements are contained in a coating disposed on a surface of at least one of the lens and image filter for scattering light transmitted therethrough.

15. The light image projection apparatus according to claim 14 in which the light-scattering elements within material of the coating include bubbles having dimensions in the range of less than about 10 µm.

16. The light image projection apparatus according to claim 14 in which the light-scattering elements within the material of the coating include particles having dimensions in the range less than about 10 µm.

17. The light image projection apparatus according to claim 14 in which the coating is disposed on a light-incident surface of at least one of the lens and image filter.

18. The light-image projection system according to claim 14 in which the coating is disposed on a light-exit surface of at least one of the lens and image filter.

19. A method for reducing intensity-contrasting segments on a viewing surface of light image projection apparatus having a lens and an image filter interposed between a light image source and the viewing surface, the method comprising the steps for:

projecting a light image through the lens and image filter toward the viewing surface, the lens and image filter each including a substrate of light-transmissive material; and interposing inhomogeneous light-scattering element in at least one of the substrates for scattering light to inhibit coherent light waves from forming interference patterns including intensity-contrasting segments on the viewing surface.

* * * * *

UNITED STATES PATENT AND TRADEMARK OFFICE
CERTIFICATE OF CORRECTION

PATENT NO. : 6,867,928 B2
DATED : March 15, 2005
INVENTOR(S) : Charles Robert Wolfe It is certified that error appears in the above-identified patent and that said Letters Patent is hereby corrected as shown below:

Column 6,
Line 63, please replace "view" with -- viewing --

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,867,928 B2 Page 1 of 1
DATED : March 15, 2005
INVENTOR(S) : Charles Robert Wolfe It is certified that error appears in the above-identified patent and that said Letters Patent is hereby corrected as shown below:

Column 8,
Line 40, please replace "element" with -- elements --.

Signed and Sealed this

First Day of November, 2005

JON W. DUDAS
*Director of the United States Patent and Trademark Office*